United States Patent
Zhang et al.

(10) Patent No.: US 10,841,791 B1
(45) Date of Patent: Nov. 17, 2020

(54) DYNAMIC FIRMWARE OVER-THE-AIR SYSTEM FOR IOT DEVICES

(71) Applicant: Verizon Patent and Licensing Inc., Arlington, VA (US)

(72) Inventors: Ning Zhang, Warren, NJ (US); Brian Matthew White, Port Murray, NJ (US); Victor Marzarella, Clinton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/552,219

(22) Filed: Aug. 27, 2019

(51) Int. Cl.
| H04M 3/00 | (2006.01) |
| H04W 8/24 | (2009.01) |
| H04W 72/12 | (2009.01) |
| G06F 8/65 | (2018.01) |

(52) U.S. Cl.
CPC .............. H04W 8/245 (2013.01); G06F 8/65 (2013.01); H04W 72/1247 (2013.01)

(58) Field of Classification Search
CPC ... H04W 72/005; H04W 8/245; H04W 12/06; H04W 24/08; H04W 4/50; H04W 4/60; H04W 4/70; H04W 60/00; H04W 72/04; H04W 72/087; H04W 80/00; H04W 84/00; H04W 84/10; H04W 84/12; H04W 84/18; H04W 88/06; H04W 88/16
USPC ... 455/418, 457, 405, 557, 419, 41.2, 456.3, 455/445, 456.1
See application file for complete search history.

(56) References Cited

U.S. PATENT DOCUMENTS

| 9,176,728 | B1* | 11/2015 | Dixit | G06F 8/71 |
| 9,609,544 | B2* | 3/2017 | Raleigh | H04W 28/0257 |
| 9,955,332 | B2* | 4/2018 | Raleigh | H04W 4/24 |
| 9,973,930 | B2* | 5/2018 | Raleigh | H04W 12/08 |
| 10,326,675 | B2* | 6/2019 | Raleigh | H04L 67/2804 |
| 2007/0015518 | A1* | 1/2007 | Winter | H04L 67/18 455/456.1 |
| 2007/0167170 | A1* | 7/2007 | Fitchett | H04W 64/00 455/456.1 |
| 2010/0332326 | A1* | 12/2010 | Ishai | H04W 4/185 705/14.58 |
| 2014/0094123 | A1* | 4/2014 | Polo | H04W 52/0216 455/41.2 |
| 2016/0205662 | A1* | 7/2016 | Cormier | H04W 8/245 370/312 |
| 2019/0053000 | A1* | 2/2019 | Filippou | G06F 8/00 |
| 2019/0297662 | A1* | 9/2019 | Palat | H04W 76/15 |

* cited by examiner

*Primary Examiner* — Joseph Arevalo

(57) ABSTRACT

A system may receive a request to schedule a wireless update for one or more user devices. The system may schedule transmission of the wireless update to the one or more user devices based on profiles associated with the one or more user devices and network load information associated with base stations associated with the one or more user devices. The profiles associated with the one or more user devices include, for each user device, a location history associated with the user device. The system may transmit the wireless update to the one or more user devices based on the scheduled transmission. The system may further schedule installation of the wireless update on the one or more user devices based on the profiles associated with the one or more user devices and send, to the one or more user devices, an indication to install the wireless update based on the scheduled installation.

20 Claims, 6 Drawing Sheets

DYNAMIC FIRMWARE OVER-THE-AIR SYSTEM FOR IOT DEVICES

BACKGROUND INFORMATION

As the popularity of Internet of Things (IoT) devices increases, a burden is placed on wireless access networks to manage the IoT devices and other user devices associated with the wireless access network. In particular, upgrading the firmware associated with the IoT devices may strain the resources of a wireless access network. In addition, an upgrade of an IoT device may fail when the wireless access network does not have the resources to deliver the upgrade, which may result in customer dissatisfaction.

DETAILED DESCRIPTION OF PREFERRED EMBODIMENTS

Figure 1:
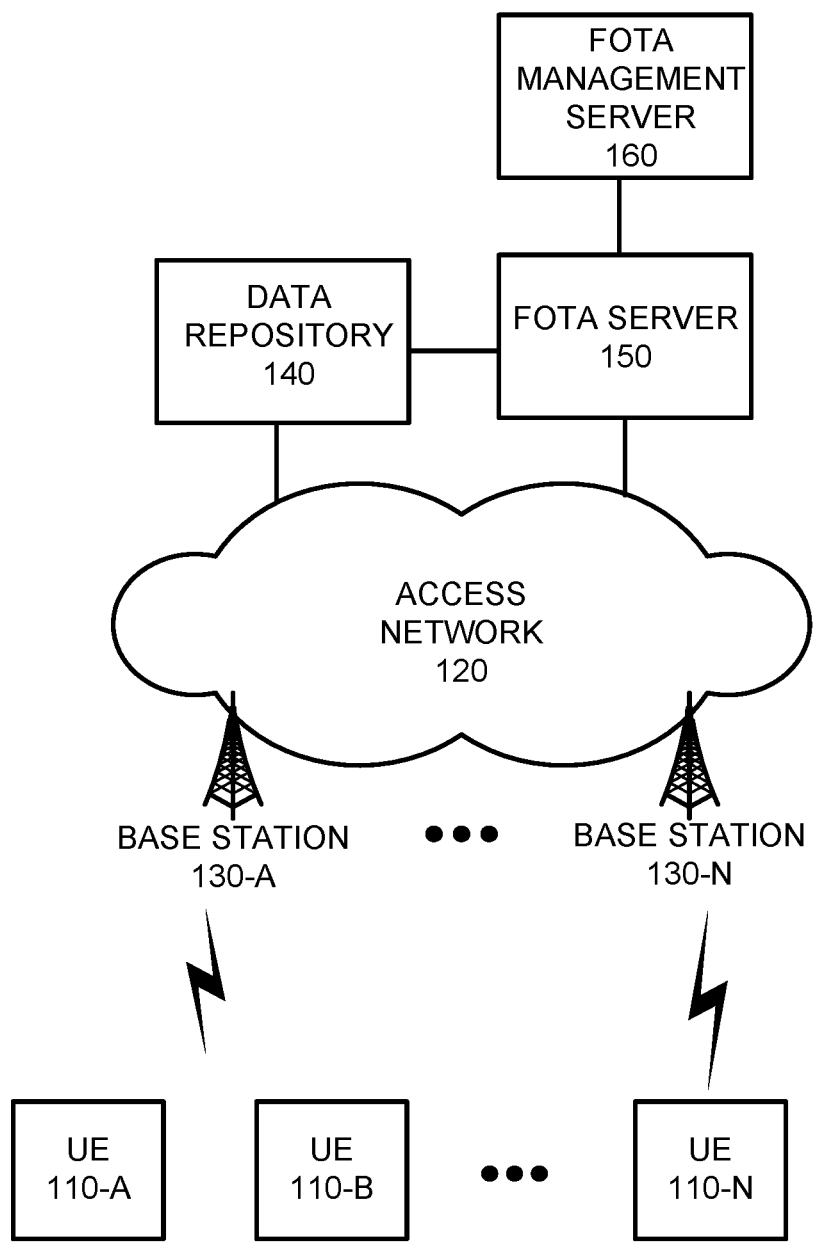
FIG. 1 is a diagram illustrating an exemplary network environment consistent with an embodiment.

The following detailed description refers to the accompanying drawings. The same reference numbers in different drawings identify the same or similar elements.

The market for Internet of Things (IoT) devices is growing rapidly. IoT devices may have a wide variety of uses, such as utility meters, environmental sensors, parking meters and/or occupancy sensors, security sensors, smart lighting, traffic cameras, advertising displays, point-of-sale terminals, vending machines, remote diagnostics devices, remote monitoring of individuals, power grid sensors and/or management devices, high speed autonomous vehicles, aerial drones, etc.

Use of IoT devices have increased exponentially and may result in a large number of such devices being serviced by a wireless access network. Estimates indicate that the number of IoT devices within a wireless operator's network may increase to millions of devices communicating with each other autonomously with little to no human intervention. Thus, a provider of wireless communication services may manage wireless access networks that include a large number of IoT devices.

A wireless network, such as a Fourth Generation (4G) LTE access network (e.g., an evolved packet core (EPC) network), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the data sent or received by IoT devices may be small compared to other types of devices, such as mobile phones used for voice communication or for streaming content. Furthermore, many IoT devices are designed for low power applications and long battery life. Therefore, use of large bandwidth channels that use large amounts of power, such as an LTE channel, for wirelessly communicating with IoT device may be an inefficient use of radio link resources.

A technology developed for IoT applications that does not require large amounts of data and that is based on a Low Power Wide Area Network (LPWAN) design is LTE Category M1 (CAT-M1). CAT-M1 channels, also sometimes referred to as enhanced machine type communications (eMTC) channels, use a total bandwidth of about 1.4 MHz and have a very low power requirement compared to an LTE channel. Another technology developed for IoT applications that does not require large amounts of data or power, is the Narrow Band (NB) IoT (NB-IoT) technology. NB-IoT is an LPWAN technology that uses 200 Kilohertz (KHz) channels, with their own guard bands, for sending small amounts of data. The use of NB-IoT channels may result in better signal penetration in hard to reach areas, such as areas likely to be occupied by IoT devices (e.g., a utility meter installed in a location that shadows or fades wireless signals). Furthermore, the use of NB-IoT channels may result in lower energy consumption and/or cheaper component cost.

An IoT device may need to perform a wireless update, also referred to as an Over-the-Air (OTA) update. One particular type of OTA update that may include the transfer of a relatively large file may be a firmware OTA (FOTA) update. Other types of OTA updates that may include the transfer of a large file may be a baseband OTA update or an application software OTA update. The firmware of an IoT device may control the low-level operation of the hardware of an IoT device and may need to be periodically updated. When an original equipment manufacturer (OEM) or another type of entity decides to add a new functionality to an IoT device, or fix a potential problem or security flaw in one or more types of IoT devices, the resources of a base station may be overwhelmed due to the thousands and potentially millions of devices that will require the update.

Performing a FOTA update on devices may include several steps. Initially, the firmware or software image or file containing the update may be transferred to the devices. Because network resources may be limited, the transferring may be restricted by network and bandwidth resources. For example, the firmware or software images or files may not be able to be transferred to the devices at certain times due to congestion of the network. Additionally, a size of the firmware or software images or files may be restricted due to the congestion. After the firmware or software images or files have been transferred to the devices, the images may be installed on the devices at specified dates or times. The installation of the images or files may impact the normal behavior of the devices. In addition, in some instances, one or more of the devices may be offline at the specified dates or times.

Currently, when a firmware update is pushed to devices according to a manual schedule, the update may be forced on the device or a user of the IoT device may have to decide when to perform the update. The current method of performing updates may not work well for many IoT devices that are not interactive with respect to users and/or owners. In addition, the current method may overload the network and cause interruption to normal operations of the IoT devices.

For example, when performing a FOTA update for a group of IoT devices, IoT devices of the group may be chosen at random to receive the FOTA update regardless of which base station serves the IoT devices or whether the IoT devices are currently online and available to receive the FOTA update. If a large number of the IoT devices are connected to the same base station, the base station may become overwhelmed and a large percentage of the upgrades may fail. In addition, when an IoT device begins to perform a firmware update by receiving a firmware update package and the base station becomes congested, the IoT device may no longer be able to continue to receive the firmware update package. In this case, the IoT device may become stuck in a failed state and a customer may have a difficult time recovering the IoT device.

In one example, a manufacturer of an IoT device may want to perform a FOTA update on thousands of IoT devices before shipping the IoT devices. Since the IoT devices are at the same location and may all be connected to the same base station and the base station has limited resources to handle the FOTA updates, the base station may become quickly overloaded. In addition, in order to save battery life, IoT devices may be offline for long periods of time. Furthermore, when an IoT device comes online, in order to use less data and fewer battery and computing resources, the IoT device may only stay online for a short period of time. Therefore, it may be difficult to perform a FOTA update for the IoT devices without the base station becoming congested and without knowledge of when the IoT devices will be online.

Implementations described herein relate to an analytics-based network aware dynamic FOTA system (DFS) that updates IoT devices based on profiles associated with the IoT devices. When an IoT device comes online to a communications network, a device profile may be created for the IoT device and registered with a communications network associated with the IoT device. Activity and location patterns and history associated with the IoT device may be monitored and the activity and location information may be dynamically added to the profile. In addition, load and congestion information associated with the communications network may be monitored. FOTA updates may be scheduled and transmitted to IoT devices based on the profiles associated with the IoT devices and the monitored load and congestion information associated with the network. Installation of the firmware update may additionally be scheduled based on the device profile.

FIG. 1 is a diagram illustrating an exemplary network environment 100 consistent with an embodiment. Network environment 100 may correspond to a DFS. As shown in FIG. 1, environment 100 may include endpoint user equipment devices (UEs) 110-A to 110-N (referred to herein collectively as "UEs 110" and individually as "UE 110"), an access network 120, a data repository 140, a FOTA server 150, and a FOTA management server 160.

UEs 110 may include any device with (e.g., cellular or mobile wireless network) wireless communication functionality. For example, UEs 110 may communicate using machine-to-machine (M2M) communication, such as MTC. For example, UE 110 may include a utility meter (e.g., electricity meter, water meter, gas meter, etc.), an asset tracking device (e.g., a system monitoring the geographic location of a fleet of vehicles, or livestock, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), health monitoring device (e.g., a blood pressure monitoring device, a blood glucose monitoring device, etc.), a personal tracking device, and/or another type of electronic device.

In other implementations, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface.

UE 110 may include an IoT device and may include characteristics associated with an IoT device. For example, UE 110 may have a small footprint, consume low amount of power, have a low throughput, be mobile or non-mobile, have a large number of connections, be offline for short or long periods of time, be located in remote environments with limited network connectivity, have varied user interfaces (UIs) or user experiences (UXs), require human interaction, and/or may be headless without a UI (i.e., be capable of operating without a user interface).

Access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a next generation node B (gNodeB)) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an evolved NodeB (eNodeB)).

Data repository 140 may include one or more devices, such as computer devices, databases, and/or server devices, to store information. Data repository 140 may be located on a cloud, on a server, or on another storage device. Data repository 140 may store data analytics associated with the DFS. For example, data repository 140 may store network statistics associated with access network 120 (e.g., load information, congestion information, etc.) and base stations 130 and statistics associated with UEs 110 (e.g., activity pattern, location information, device signal strength, etc.). Information stored on data repository 140 may be used to schedule and install FOTA updates on UEs 110.

FOTA server 150 may include one or more devices, such as computer devices, databases, and/or server devices, that facilitate providing firmware updates to UEs 110. FOTA server 150 may be affiliated with the OEM or another type of entity that determines when to add a new functionality to UEs 110, fix a potential security flaw in UEs 110, update firmware, etc. Additionally, FOTA server 150 may be affiliated with a network of a communication services provider. The firmware may be pushed to the communication services provider for deployment to UEs 110 within a time frame or at a scheduled time. FOTA server 150 may facilitate providing firmware updates to UEs 110 by providing the updates via access network 120 and base station 130. In addition, FOTA server 150 may utilize algorithm-based automatic scheduling of FOTA updates using information stored in data repository 140.

FOTA management server 160 may include one or more devices, such as computer devices, databases, and/or server devices, that direct FOTA server 150 to provide firmware updates to UEs 110. FOTA management server 160 may receive inputs from customers including information for scheduling a FOTA update campaign (e.g., identification of UEs 110 to receive the FOTA update, device profiles associated with the UEs 110, an identification of the firmware update package, a time to start the FOTA campaign, etc.). FOTA management server 160 may provide the information to FOTA server 150 for scheduling the campaign.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
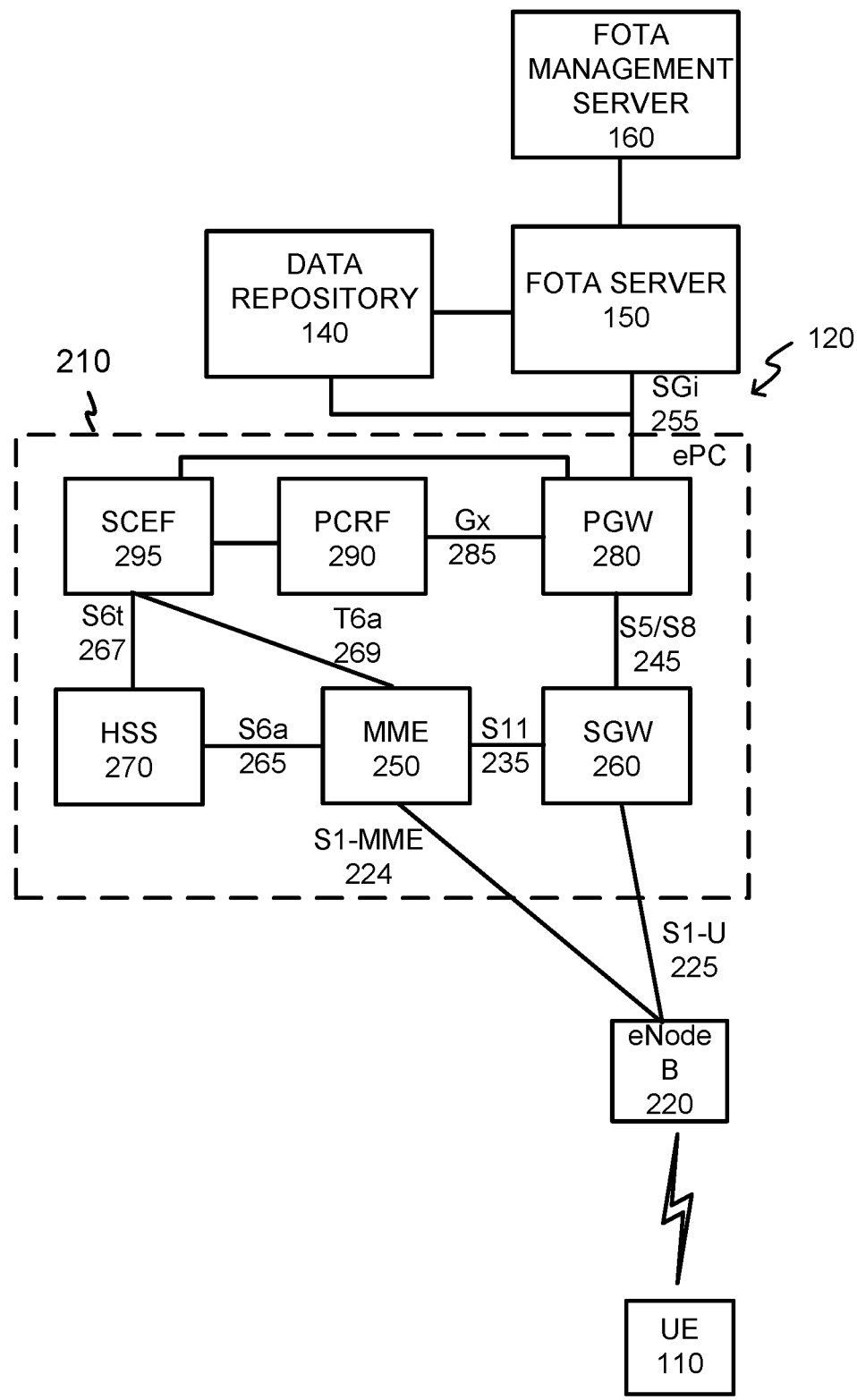
FIG. 2 is a block diagram of an exemplary system having an access network based on a Long Term Evolution (LTE)

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown). As shown in FIG. 2, FOTA server 150 may be connected to access network 120 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 may provide wireless packet-switched services and wireless packet connectivity to user devices to provide, for example, data, voice, and/or multimedia services. EPC 210 may further include a Mobility Management Entity (MME) 250, a serving gateway (SGW) 260, a home subscriber server (HSS) 270, a packet data network gateway (PGW) 280, a Policy and Charging Rules Function (PCRF) 290, and a Service Capability Exposure Function (SCEF) 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. eNodeB 220 may interface with ePC 210 via a S1 interface, which may be split into a control plane S1-MME interface 224 and a data plane S1-U interface 225. enodeB 220 may interface with MME 250 via S1-MME interface 224, and interface with SGW 260 via S1-U interface 225. S1-U interface 225 may be implemented, for example, using general packet radio service (GPRS) Tunneling Protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may activate and deactivate bearers for UE 110 and may facilitate setting up a FOTA session. MME 250 may also select a particular SGW 260 for a particular UE 110. MME 250 may interface with other MMES (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to data repository 140 and/or FOTA server 150 via a wide area network (WAN) through a SGi interface 255. A particular UE 110, while connected to a single SGW 260, may be connected to multiple PGWs 280, one for each packet network with which UE 110 communicates.

Alternatively, UE 110 may exchange data with data repository 140 and/or FOTA server 150 though a WiFi wireless access point (WAP) (not shown). The WiFi WAP may be part of a local area network, and access data repository 140 and/or FOTA server 150 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. HSS 270 may additionally store information about UE 110, such as whether UE 110 is capable of switching from NB-IoT mode to CAT-M1 mode. MME 250 may communicate with HSS 270 through an Sha interface 265. Sha interface 265 may be implemented, for example, using a Diameter protocol.

PCRF 290 may provide policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 285. Gx interface 285 may be implemented, for example, using a Diameter protocol.

SCEF 295 may include a network or computational device that provides exposure of 3GPP network service capabilities to third party applications. Specifically, SCEF 295 may provide network events through application programming interfaces (APIs) to external applications which may reside on FOTA server 150 and/or UEs 110. Exposure of the various events may include, for example: UE 110 reachability; UE 110 loss of connectivity; UE 110 location reporting; UE 110 roaming status; communication failure; and change of international mobile equipment identifier—international mobile subscriber identifier (IMEI-IMSI) association. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and FOTA server 150. According to an implementation described herein, SCEF 295 may act as a gateway for connecting UE 110 to FOTA server 150. Generally, SCEF 295 may expose application-programming interfaces (APIs) for multiple application servers (such as FOTA server 150) to access network services to communicate with UEs 110. SCEF 295 may communicate with MME 250 via a modified T6a interface relative to a standardized T6a interface. SCEF 295 may act as an agent for performing a FOTA update for UE 110. Alternatively, SCEF 295 may facilitate setting up a FOTA session to allow FOTA server 150 to perform the FOTA update for UE 110.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
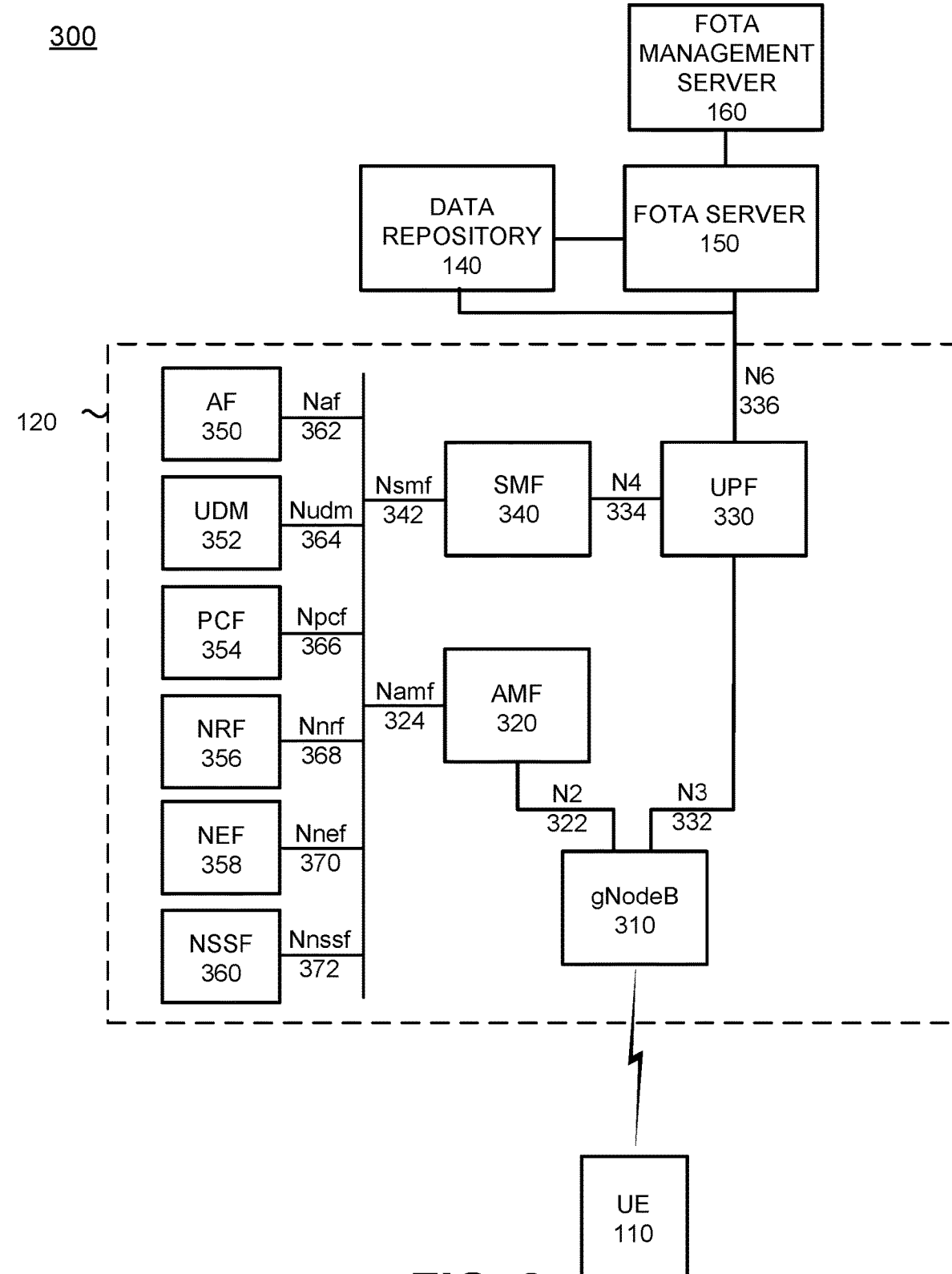
FIG. 3 is a block diagram of an exemplary system having an access network based on 5G.

FIG. 3 is a block diagram of an exemplary system 300 having an access network 120 based on a 5G standard. As shown in FIG. 3, system 300 may include UE 110, access network 120, data repository 140, and FOTA server 150, and FOTA management server 160.

Access network 120 may include a gNodeB 310 (corresponding to base station 130), an Access and Mobility Management Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network, perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to FOTA server 150 and/or data repository 140 via a WAN using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to FOTA server 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370. NEF 358 may act as an agent for performing a FOTA update for UE 110. Alternatively, NEF 358 may facilitate setting up a FOTA session to allow FOTA server 150 to perform the FOTA update for UE 110.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
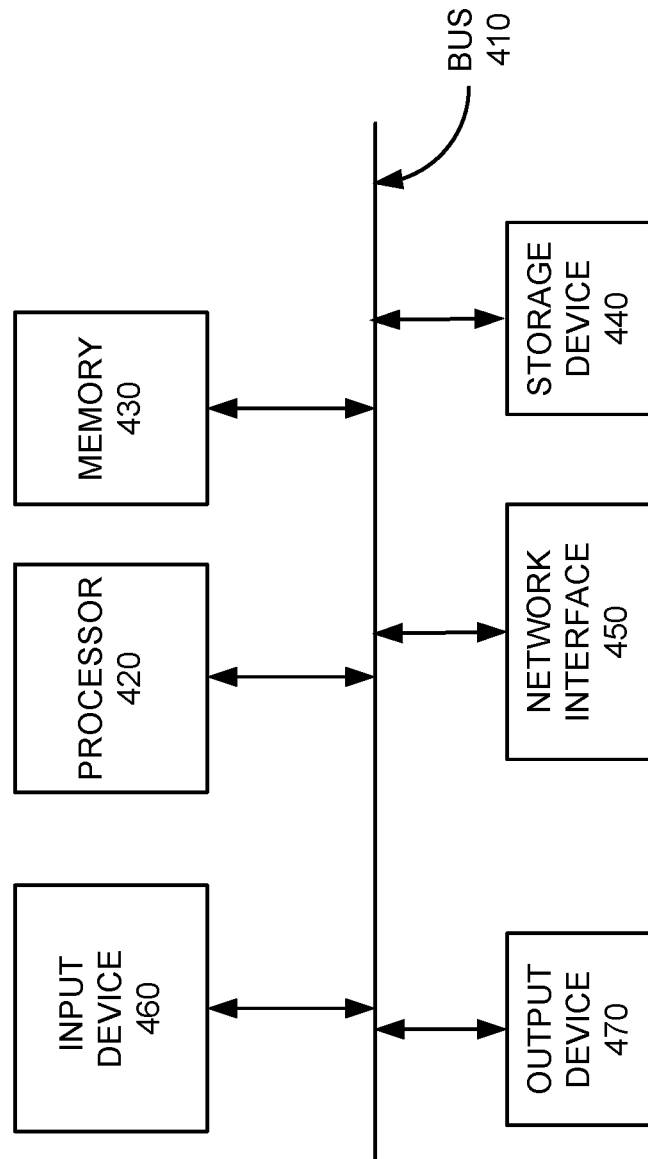
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIG. 2 and/or FIG. 3, such as, for example, UE 110, FOTA server 150, FOTA management server 160, MME 250, AMF 320, HSS 270, UDM 352, SCEF 295, and/or NEF 358, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 provides a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to access network 120.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 400 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth wireless interface, a radio frequency identification device (RFID) interface, a near field communications (NFC) wireless interface, and/or any other type of interface that converts data from one form to another form.

As described below, network device 400 may perform certain operations relating to communications from FOTA server 150 to UEs 110. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flows charts in FIGS. 5 and 6.

Although FIG. 4 shows exemplary components of network device 400, in other implementations, network device 400 may include fewer components, different components, additional components, or differently arranged components than depicted in FIG. 4.

Figure 5:
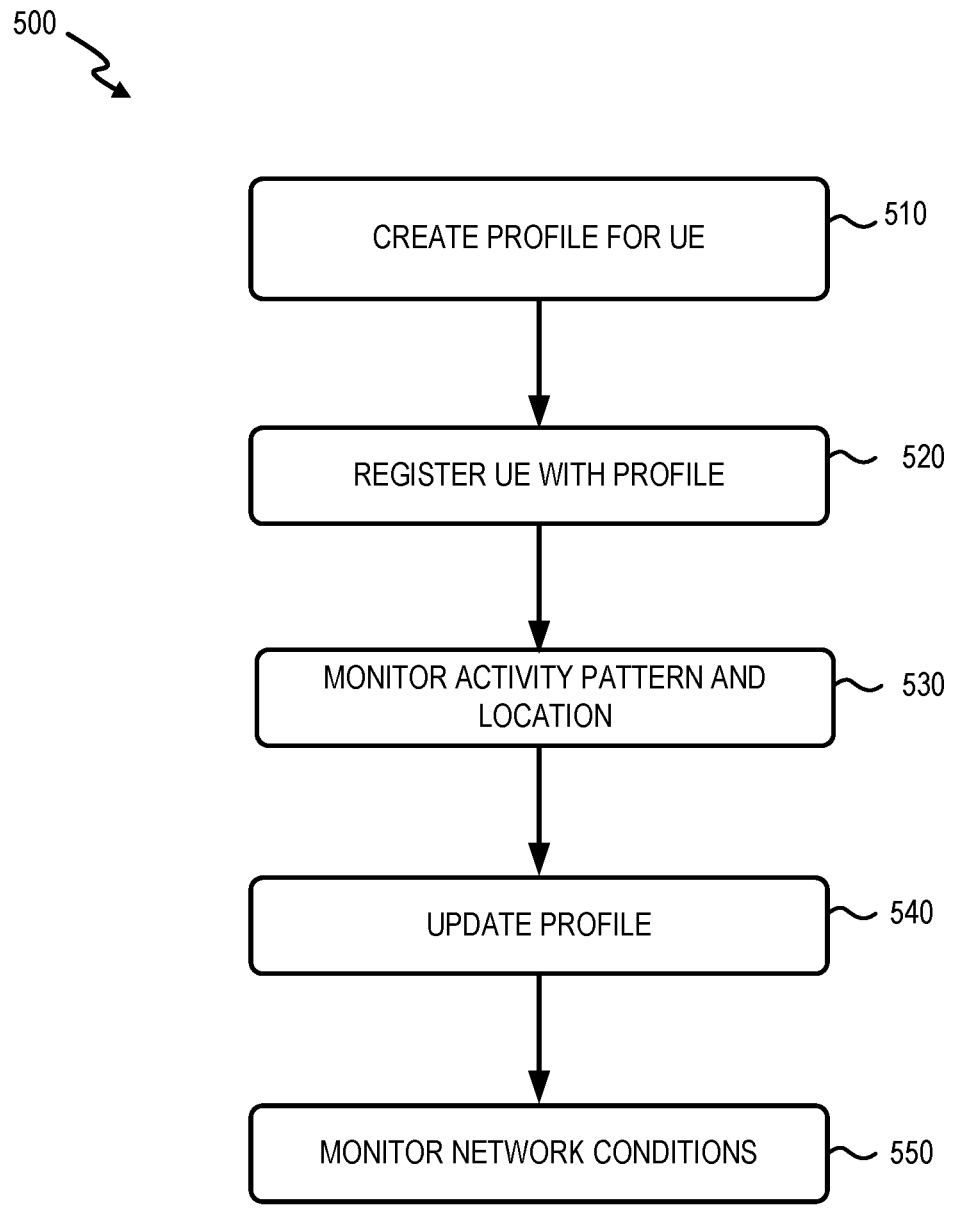
FIG. 5 is a flowchart of a process for creating a profile for a user device in an embodiment.

FIG. 5 is a flow diagram illustrating an exemplary process 500 for registering an IoT device and maintaining a profile for the IoT device. In one implementation, process 500 may be implemented by the DFS.

Process 500 may begin when a profile is created for UE 110 (block 510). For example, UE 110 may be brought online and characteristics of UE 110 may be determined by FOTA server 150. The characteristics may include, for example, the make, model, and current firmware version of UE 110. The characteristics may further include an indication of whether UE 110 requires user interaction to perform a FOTA update. For example, UE 110 may be a headless IoT device without a user interface that may require an automatic FOTA update without user interaction. In another example, UE 110 may be a UE that requires a user acceptance to perform a FOTA update (e.g., a wearable IoT device with a user interface). The characteristics may further include an indication of whether UE 110 is a mobile device or a non-mobile device. For example, UE 110 may be a mobile device (e.g., a wearable IoT device, a tracker, etc.) that may connect to different base stations 130 as it moves. Alternatively, UE 110 may be a fixed IoT device (e.g., a stationary sensor, a retail kiosk, an alarm panel, a parking meter, etc.) that remains connected to a single base station 130.

The characteristics may also include an average package size of a FOTA update for UE 110. The average package size may be selected from multiple size ranges. The average package size may be an estimate based on an average package size of UEs 110 with similar characteristics. The average package size may further be based on firmware currently installed on UE 110. The characteristics may further include a priority class for UE 110. In one implementation, UE 110 may have a high priority designation if FOTA updates are urgent for UE 110 or if it is necessary to finish FOTA updates in a short period of time for UE 110. For example, UE 110 may be a high priority device if UE 110 is associated with emergency personnel or is essential for emergency situations. In this example, UE 110 may require a FOTA update urgently in order to work properly for emergency responses. In addition, UE 110 may require the FOTA update to be received and installed quickly to experience limited disruptions or downtime while installing the FOTA update. As another example, a user of UE 110 may purchase a service plan that guarantees a higher priority for FOTA updates.

When the characteristics of UE 110 have been determined, the characteristics may be stored in a profile associated with UE 110 and UE 110 may register with, for example, FOTA server 150 using the profile (block 520). For example, FTOA server 150 may store the profile for UE 110 at data repository 140. In addition, the registered profile may be used to determine FOTA service pricing per device type. For example, devices requiring larger update packages or higher priorities may incur a higher service cost. The determined update service plan for UE 110 may be stored in the device profile. A user of UE 110 may subsequently upgrade or downgrade the service plan based on a desired priority and speed for FOTA updates.

Process 500 may continue by monitoring an activity pattern and a location pattern associated with UE 110 (block 530). For example, FOTA server 150 may monitor an activity pattern of UE 110 to determine at which times UE 110 is reachable. For example, UE 110 may be offline (e.g., in a power saving mode) for large periods of time and unable to receive a FOTA update during these periods of time. In addition, UE 110 may be online and active (i.e., transmitting data) during particular time periods. UE 110 may further be online and idle during certain time periods. By monitoring an activity pattern of UE 110, FOTA server 150 may be able to learn and predict at what times UE 110 may be able to receive and download a firmware package (i.e., when UE 110 is online) and install the firmware package without disrupting normal operations (i.e., when UE 110 is online and idle).

In addition, FOTA server 150 may connect to a location service to track a location associated with UE 110. For example, if UE 110 is a mobile IoT device, the location of UE 110 may be monitored to determine which cells or tracking areas UE 110 visits most frequently. In addition, FOTA server 150 may monitor the location of UE 110 and may determine which base stations 130 UE 110 is attached to for the greatest amount of time (e.g., per day, per week, per month, etc.). Furthermore, FOTA server 150 may monitor the location of UE 110 to determine which base stations 130 UE 110 is attached to during certain times (e.g., during certain times of the day, certain times of the week, etc.). In this way, FOTA server 150 may be able to learn and predict where UE 110 will likely be, and to which base station 130 UE 110 will most likely be attached, for scheduling a FOTA update. In addition, by tracking the location of UEs 110, DFS may be able to determine how UEs 110 are distributed geographically in order to schedule updates for UEs 110 without overloading base stations 130. If UE 110 is a stationary device, infrequent location updates may be necessary in order to determine to which base station 130 UE 110 is attached.

The profile of UE 110 may be updated based on monitoring the activity pattern and location pattern of UE 110 (block 540). For example, FOTA server 150 may continuously monitor the activity pattern and location information associated with UE 110 and may continuously update the profile based on the monitoring. The profile may be updated periodically (e.g., once a week, once a month, etc.). The profile may further be updated when a new pattern of activity or location is detected. For example, the profile may be updated to reflect a new pattern of location activity when UE 110 is in new locations or is attached to different base stations 130 for a long enough period of time to create a new location pattern (e.g., when UE 110 is attached to new base stations 130 in a pattern for two weeks, one month, etc.).

Network conditions may be monitored to determine network load and congestion levels (block 550). For example, network conditions in different tracking area and congestions levels associated with different base stations 130 may be continuously monitored to determine network traffic levels in different areas at different times. In particular, network conditions at the cells and tracking areas that UE 110 most frequently visits may be monitored by FOTA server 150 to determine times when base stations 130 are most congested and when base stations 130 are free of congestion. In this way, FOTA server 150 may be able to schedule FOTA update transmissions to UEs 110 at times and locations when the network is free of congestion and UEs 110 are most likely to receive the updates quickly and without interruption.

In addition, machine learning may be implemented to better predict when and where to schedule the FOTA update transmissions. In such implementations, machine learning algorithms may use neural networks or other machine learning processing to enable the system to make decisions or predictions based on data associated with base stations 130 or UEs 110 without requiring a user's active participation. For example, the system may use machine learning algorithms to monitor traffic patterns of base stations 130 to learn the capabilities of base stations 130 and match the capabilities with the best time to transmit FOTA update. For example, the system/machine learning algorithm may predict times of light data traffic with respect to base stations 130 and determine to send FOTA updates during the times of expected light data traffic. In addition, the system may utilize machine learning algorithms to determine patterns associated with UEs 110. For example, the system may monitor capabilities and activities associated with UEs 110 and may determine the best time for UEs 110 to receive the FOTA update transmissions based on the capabilities and activities. For example, the machine learning algorithm may predict times when UEs 110 are not active or experiencing a low level of activity (e.g., not transmitting or receiving large amounts of data) and may determine that the low activity times associated with UEs are optimal times to transmit FOTA updates. In this manner, the system may schedule FOTA updates using the machine learning predictions associated with base stations 130 and UEs 110.

By continuously monitoring the activity and location patterns of UE 110 and the network conditions and by utilizing machine learning to predict patterns of base stations 130 and UE 110, FOTA server 150 may be able to schedule a FOTA update in order to maximize network efficiency and to minimize service interruption to UE 110. For example, FOTA server 150 may be able to schedule a transmission of a firmware package to UE 110 when UE 110 is most likely online and attached to a base station 130 that is not congested. In addition, FOTA server 150 may be able to schedule the firmware installation at a time when UE 110 is online and idle, so as to minimize disruption to the normal operations of UE 110.

Figure 6:
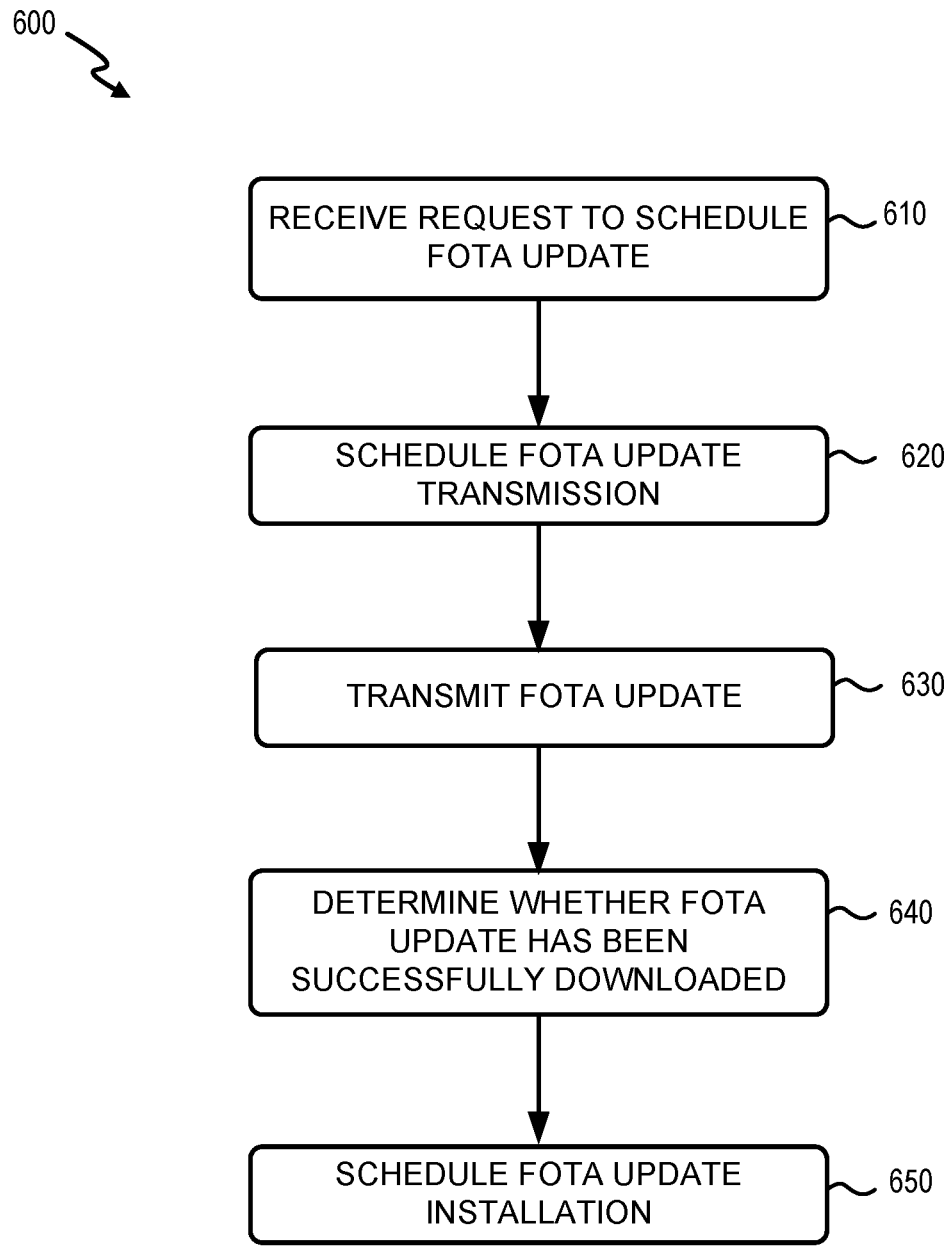
FIG. 6 is a flowchart of a process for performing a Firmware Over-the-Air (FOTA) update in an embodiment.

FIG. 6 is a flow diagram illustrating an exemplary process 600 for scheduling transmission and installation of firmware update packages. In one implementation, process 600 may be performed by FOTA server 150 and/or FOTA management server 160.

Process 600 may begin by FOTA server 150 receiving a customer request to schedule a FOTA update for one or more UEs 110 (block 610). For example, a manufacturer or another type of entity (hereinafter customer) may wish to perform a FOTA update campaign for a group of UEs 110 before shipping the UEs 110 to retail or other locations. As another example, the customer may wish to perform a FOTA update on a group of UEs 110 or individual UEs 110 to correct a bug or to provide new functionality for UEs 110 or for another reason.

In order to schedule the FOTA update campaign for the group of UEs 110, the customer may submit a request to FOTA server 150 to perform the FOTA update on UEs 110. The request may include, for example, a list of UEs 110 to receive the FOTA update, the device profiles associated with UEs 110, an indication of the firmware update package to be installed on UEs 110, and a date and time to start the FOTA update campaign. In one implementation, if the request is for a group of UEs 110, the date and time may indicate the time to start the transmittal of the FOTA update to the first UEs 110 in the group of UEs 110. However, the FOTA update campaign may take place over several days or weeks based on the number of UEs 110 scheduled to receive the update, the profiles of the UEs 110, and the network load and congestion levels. In another implementation, if the request is for a FOTA update for individual UE 110s, the date may include a date range when it would be optimal for the individual UEs 110 to receive the FOTA update packages.

Process 600 may continue by FOTA server 150 scheduling the FOTA transmission for UEs 110 to download (block 620). FOTA server 150 may use the profiles of UEs 110 stored in data repository 140 and the monitored network load levels to automate the schedule of the FOTA download. Since FOTA server 150 is network resource aware, FOTA server 150 may transmit the firmware packages to UEs 110 dynamically using an automatic smart scheduling mechanism in order to satisfy the customer request, optimize the network efficiency, minimize network congestion, and minimize service interruption for UEs 110.

Scheduling the FOTA download may be based on a workload of base stations 130. For example, based on the profiles of UEs 110, FOTA server 150 may determine likely locations for UEs 110 at particular times and may identify the base stations 130 in the likely locations. For a UE 110 that is non-mobile, FOTA server 150 may determine that the location is a specific cell site. For a UE 110 that is mobile, FOTA server 150 may identify a cluster of cell sites as the likely locations. When the likely locations are determined, FOTA server 150 may measure the workload at the cell sites. Many different key performance indicators (KPIs) may be used to calculate the workload at base stations 130. For example, the workload may be calculated based on a combination of processor usage, bandwidth usage, and additional KPIs. The workload of base stations 130 may be used as a deciding factor when determining when to schedule the FOTA update transmittal. A proposed FOTA download campaign time period for UEs 110 may be determined based on the calculated workload.

When the proposed FOTA update transmittal campaign time period has been determined, FOTA server 150 may calculate a projected workload of base stations 130 during the proposed FOTA update transmittal campaign period. The projected workload may be based on historical data, a size of the FOTA update package, the time period chosen, and/or additional factors. The projected workload of base stations 130 during the proposed FOTA update transmittal campaign time period may be compared to the calculated workload of base stations 130. If the increase in workload during the campaign is within a predetermined bandwidth level, the FOTA transmittal campaign may be scheduled. If the increase in the workload after adding the traffic from the FOTA update transmittal campaign is above the predetermined bandwidth level, FOTA server 150 may determine a new proposed FOTA update transmittal campaign period and may perform additional workload calculations.

In addition, the scheduling of the FOTA transmittal may be based on priority classes of UEs 110. Each UE 110 may have a particular priority class. Each priority class may be associated with a maximum allowed incremental cell workload measure. A higher priority class may have a higher allowed incremental workload. For example, a higher priority class may be allowed more bandwidth or more resources to be allocated for the FOTA update.

In one implementation, FOTA server 150 may limit a number of NB-IoT devices attached to a base station 130 scheduled to receive the FOTA update at a particular time. An average base station 130 may allow only up to a maximum number of simultaneous FOTA updates. Therefore, knowing where UEs 110 are located when scheduling the FOTA update transmittal may be beneficial and avoid congested-related problems. In addition, FOTA server 150 may control the number of scheduled devices within the allowed limit while leaving a certain margin of error.

In another implementation, the FOTA server 150 may push FOTA updates to selected CAT-M1 devices using Evolved Multimedia Broadcast Multicast Services (eMBMS) technology. Using eMBMS, the same content may be delivered to a large number of CAT-M1 devices at the same time, which may result in a more efficient use of network resources. The wireless communication services provider may have full control over the contents to be broadcast within the bandwidth designated for the broadcast. eMBMS may deliver broadcast and multicast services within a cell and within the core network. Using eMBMS, FOTA server 150 may be able to restrict FOTA updates to the cell sites where the targeted UEs 110 are located and therefore utilize network resources most efficiently.

In addition, a group of UEs 110 scheduled to receive the FOTA update may be divided into subsets of UEs 110. For example, UEs 110 may be divided into subsets based on network load, device active/idle behaviors, device locations, and/or additional factors. The scheduling of the FOTA update transmittal may further be based on the subsets of UEs 110. FOTA server 150 may continue to monitor UEs 110 and update profiles associated with UEs 110 in order to adjust the performance for scheduling the FOTA update transmittal and for scheduling future FOTA campaigns.

For mobile UEs 110, FOTA server 150 may monitor a received signal strength indicator (RSSI) at the mobile UEs 110. If the RSSI is poor, the FOTA update transmittal may be postponed until UE 110 has a greater RSSI. For example, when a mobile UE 110 is at the edge of a cell, the RSSI may be poor and downloading the FOTA update may take considerably longer than when UE 110 has better coverage. In this situation, it may be a waste of network resources to attempt to transmit the FOTA update to UE 110. In addition, receiving the FOTA update may unnecessarily waste resources and battery life of UE 110 and may interrupt normal operations of UE 110. In this example, postponing the transmittal of the FOTA update may save time and resources associated with the network and UE 110.

After the FOTA update transmittal has been scheduled, FOTA server 150 may transmit the FOTA update to UEs 110 (block 630). For example, based on the above described factors, FOTA server 150 may transmit the FOTA update to the UEs 110 or a subset of the UEs 110 based on the determined schedule. After the transmission, FOTA server 150 may determine whether the FOTA update package has been successfully downloaded on UEs 110 scheduled to receive the download (block 640). Ensuring that UEs 110 have successfully downloaded the update package prior to scheduling installation of the FOTA update on UEs 110 may save battery power and other network resources. In this way, FOTA server 150 may be able to reschedule transmission of the FOTA update to UEs 110 that have not successfully downloaded the FOTA update.

Once the FOTA update has been successfully downloaded on UEs 110, installation of the firmware update on UEs 110 may be scheduled (block 650). Based on the profiles of UEs 110, FOTA server 150 may schedule the firmware update to be installed on UEs 110 during time periods that cause the least service interruption to UEs 110. Ideally, installation of the update may be scheduled for a time period when UEs 110 are idle and online. In this way, UEs 110 may be available to receive an indication to install the downloaded FOTA update package and the installation may be completed without interrupting the normal operations of UEs 110.

If an idle period is not available, FOTA server 150 may schedule the installation of the FOTA update package for the least active time period possible. In this way, IoT service down time due to the FOTA update installation may be minimized. In some situations, service interruption while installing the firmware on UEs 110 may be unavoidable. For example, UE 110 may not have a long enough idle time period to allow the update package to install. In this example, FOTA server 150 may report the interruption period due to the firmware update. FOTA server 150 may use the reported information for scheduling subsequent FOTA updates.

In one implementation, when UE 110 receives the FOTA update, UE 110 may automatically install the FOTA update.

In this implementation, UE 110 may install the FOTA update without receiving an additional instruction from FOTA server 150. In another implementation, the FOTA update may include instructions indicating when UE 110 should install the FOTA update. In this implementation, UE 110 may install the FOTA update at the time indicated in the instructions in the FOTA update.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by one or more processors, a request to schedule a wireless update for one or more user devices;
   scheduling, by the one or more processors, transmission of the wireless update to the one or more user devices based on profiles associated with the one or more user devices and network load information associated with base stations associated with the one or more user devices, wherein the base stations are associated with locations at which the one or more user devices have been located, wherein the profiles associated with the one or more user devices include, for each user device, a location history associated with the user device, wherein scheduling the transmission is based on location patterns associated with the one or more user devices and congestion levels of the base stations, and wherein the location patterns are based on the location histories;
   transmitting, by the one or more processors, the wireless update to the one or more user devices based on the scheduled transmission;
   scheduling, by the one or more processors, installation of the wireless update on the one or more user devices based on the profiles associated with the one or more user devices; and
   sending, by the one or more processors and to the one or more user devices, an indication to install the wireless update based on the scheduled installation.

2. The method of claim 1, wherein the profiles associated with the one or more user devices further include, for each user device of the one or more user devices, an activity history associated with the user device.

3. The method of claim 1, wherein the wireless update includes a firmware Over-the-Air (FOTA) update.

4. The method of claim 1, wherein scheduling the transmission of the wireless update is further based on times when the one or more devices are historically online.

5. The method of claim 1, wherein scheduling the transmission of the wireless update is further based on priorities associated with the one or more user devices.

6. The method of claim 1, wherein scheduling the transmission of the wireless update includes scheduling the transmission based on a machine learning process associated with the one or more user devices and the base stations.

7. The method of claim 1, wherein scheduling the installation of the firmware update includes scheduling the installation at times that cause a shortest interruption to the one or more user devices.

8. A system comprising:
   a memory to store instructions; and
   one or more processors configured to execute the instructions to:

receive a request to schedule a wireless update for one or more user devices;

schedule transmission of the wireless update to the one or more user devices based on profiles associated with the one or more user devices and network load information associated with base stations associated with the one or more user devices, wherein the base stations are associated with locations at which the one or more user devices have been located, wherein the profiles associated with the one or more user devices include, for each user device, a location history associated with the user device, wherein scheduling the transmission is based on location patterns associated with the one or more user devices and congestion levels of the base stations, and wherein the location patterns are based on the location histories;

transmit the wireless update to the one or more user devices based on the scheduled transmission;

schedule installation of the wireless update on the one or more user devices based on the profiles associated with the one or more user devices; and send, to the one or more user devices, an indication to install the wireless update based on the scheduled installation.

9. The system of claim 8, wherein the profiles associated with the one or more user devices further include, for each user device of the one or more user devices, an activity history associated with the user device.

10. The system of claim 8, wherein the wireless update includes a firmware Over-the-Air (FOTA) update.

11. The system of claim 8, wherein, when scheduling the transmission of the wireless update, the one or more processors are further configured to execute the instructions to schedule the transmission based on times when the one or more devices are historically online.

12. The system of claim 11, wherein, when scheduling the transmission of the wireless update, the one or more processors are further configured to execute the instructions to schedule the transmission based on priorities associated with the one or more user devices.

13. The system of claim 11, wherein, when scheduling the transmission of the wireless update, the one or more processors are further configured to execute the instructions to schedule the transmission based on a machine learning process associated with the one or more user devices and the base stations.

14. The system of claim 11, wherein, when scheduling the installation of the firmware update, the one or more processors are further configured to execute the instructions to schedule the installation at times that cause a shortest interruption to the one or more user devices.

15. A non-transitory computer-readable medium storing instructions, the instructions comprising:
one or more instructions that, when executed by a processor, cause the processor to:
receive a request to schedule a wireless update for one or more user devices;
schedule transmission of the wireless update to the one or more user devices based on profiles associated with the one or more user devices and network load information associated with base stations associated with the one or more user devices, wherein the base stations are associated with locations at which the one or more user devices have been located, wherein the profiles associated with the one or more user devices include, for each user device, a location history associated with the user device, wherein scheduling the transmission is based on location patterns associated with the one or more user devices and congestion levels of the base stations, and wherein the location patterns are based on the location histories; and
transmit the wireless update and at least one of a scheduled installation time or instructions to install the wireless update to the one or more user devices based on the scheduled transmission.

16. The non-transitory computer-readable medium of claim 15, wherein the profiles associated with the one or more user devices further include, for each user of the one or more user devices, an activity history associated with the user device.

17. The non-transitory computer-readable medium of claim 15, wherein the wireless update includes a firmware Over-the-Air (FOTA) update.

18. The non-transitory computer-readable medium of claim 15, wherein the instructions that cause the processor to schedule the transmission of the wireless update further comprise one or more instructions that cause the processor to schedule the transmission of the wireless update based on times when the one or more devices are historically online.

19. The non-transitory computer-readable medium of claim 15, wherein the instructions that cause the processor to schedule the transmission of the wireless update further comprise one or more instructions that cause the processor to schedule the transmission of the wireless update based on priorities associated with the one or more user devices.

20. The non-transitory computer-readable medium of claim 15, wherein the instructions that cause the processor to schedule the transmission of the wireless update further comprise one or more instructions that cause the processor to schedule the transmission based on a machine learning process associated with the one or more user devices and the base stations.

* * * * *